Figure 1:
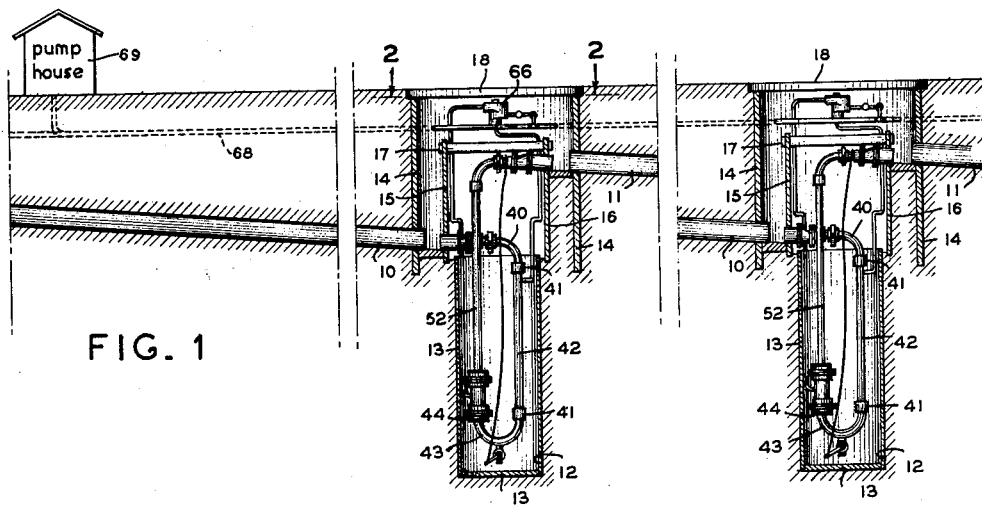

Feb. 26, 1963 J. W. WAKEFIELD 3,078,809
DIFFUSED AIR SEWAGE LIFT
Filed Feb. 8, 1960 2 Sheets-Sheet 1

INVENTOR
JOHN W. WAKEFIELD
BY
ATTORNEY

Feb. 26, 1963    J. W. WAKEFIELD    3,078,809
DIFFUSED AIR SEWAGE LIFT
Filed Feb. 8, 1960    2 Sheets-Sheet 2
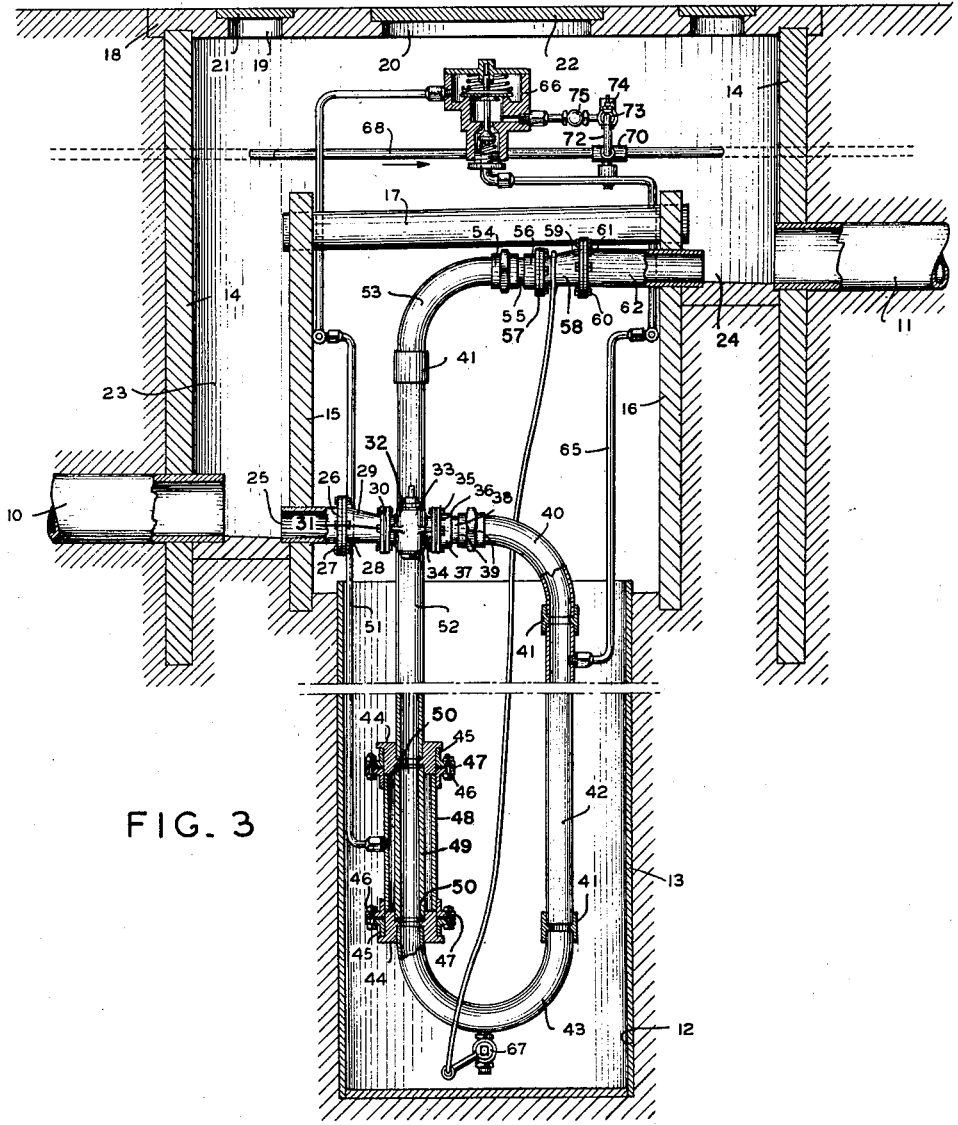
FIG. 3
FIG. 4
INVENTOR
JOHN W. WAKEFIELD
BY 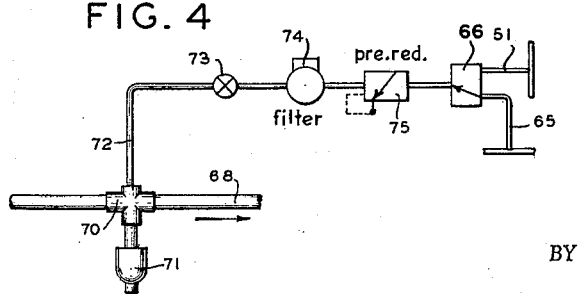
ATTORNEY

United States Patent Office 3,078,809
Patented Feb. 26, 1963

3,078,809
DIFFUSED AIR SEWAGE LIFT
John W. Wakefield, 1602 Carruthers St.,
Tallahassee, Fla.
Filed Feb. 8, 1960, Ser. No. 7,185
2 Claims. (Cl. 103—232)

This invention relates to sewage systems in which sewage flows by the force of gravity and to the lifting or transfer of the sewage from a lower elevation in such system to a slightly higher elevation in order that it can continue its flow to a sewage separation system or other place of discharge.

The invention relates particularly to the raising or lifting of sewage from a lower to a higher elevation by means of a generally U-shaped pipe system in which means of the specific gravity of the column in one of the legs of the U is reduced to cause a portion of the contents of such leg to be elevated above the height of the other leg and discharged.

The lifting of sewage from lower to higher elevations has been accomplished by means of complicated and expensive systems including sumps and pumps requiring attention and upkeep, and in which it has been necessary to maintain the lifting portions of the system above water and which have not been practical in the presence of high ground water. Such systems also have lacked aeration to avoid septicity, and they have had sharp corners and obstructions causing clogging and restriction of the flow as well as the collection of sand and other solids which had to be removed.

It is an object of the invention to overcome many of the problems heretofore encountered by providing a relatively simple and inexpensive air lift for sewage system eliminating the necessity for complicated collection sumps, electric pumping stations, and other expensive equipment, but which system employs a generally U-shaped pipe system and air to unbalance the legs thereof to produce the necessary lifting action.

Another object of the invention is to provide a sewage system embodying a pressure control sewage lift particularly suitable for use in low flat coastal plain or other areas of low gradient and high water table in which pipe can be laid on the usually acceptable minimum slope of .0035% and starting at a minimum depth of 3.5 feet to the flow line of the sewer and upon reaching a depth of 7 feet the present invention may be utilized to lift the sewage to an outlet sewer 3.5 feet below the surface.

Another object of the invention is to provide a lift which will provide for substantially continuous flow of the sewage to the treatment plant and reducing any sludge action instead of the infrequent intermittent operation of the usual pumping stations and resulting in either starving or sludging of the biological treatment devices which have been found to work more satisfactorily when the organic load is constant, too much or too little organic food having been found to cause upsets to the delicate balance of growth and death of organisms on which such devices depend.

Another object of the invention is to provide a lift in which as it is operated compressed air will be diffused into the flowing sewage providing automatic aeration preventing septicity and avoiding formation of obnoxious odors as well as making the sewage more readily treatable when it reaches the sewage treatment plant.

A further object of the invention is to provide a lift susceptible of individual or multiple installation subject to single or individual control and in each of the lifts the inflow and outflow is substantially constant and has a capacity equal to the maximum required providing a safety factor in handling excessive or peak loads or to handle normal loads when one unit is out of action and also contemplating the use of units disposed at different depths below the inflow sewer with one of such units being intended to operate on low flow while the other operates on excess flow, and in which sediment in the form of sand or solids in the bottom of the unit easily may be removed.

Figure 2:
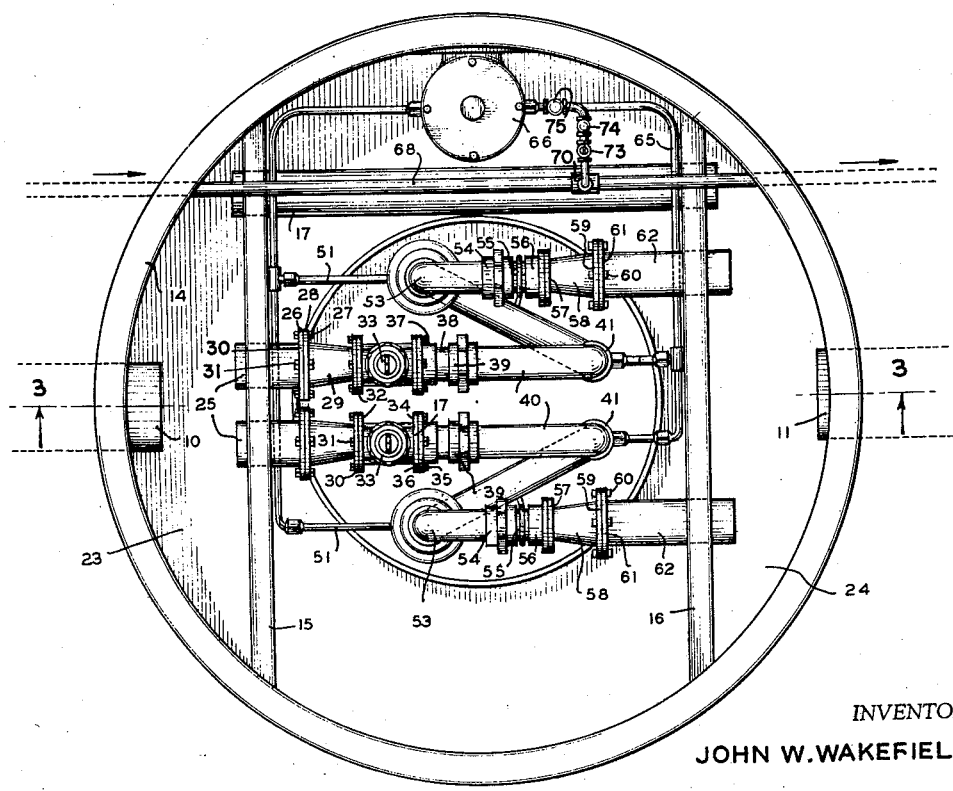

Other objects and advantages of the invention will be apparent from the following description taken in conjunction with the accompanying drawing wherein:

FIG. 1 is a schematic view illustrating multiple lifts and controls in connection with a sewage system;

FIG. 2, a cross on line 2—2 of FIG. 1;

FIG. 3, a vertical section on line 3—3 of FIG. 2; and

FIG. 4, a diagrammatic view of the hookup and controls.

Briefly stated, the lift of the present invention embodies a generally U-shaped pipe system in which the legs of the U are disposed in upright position and in which the pipe is of relatively light weight plastic of substantially uniform and unobstructed internal diameter, one of such legs being connected to the source of sewage and the other leg extending upwardly and discharging at a higher elevation, the lower portion of the pipe of the last mentioned leg being composed of Carborundum or other substance with microscopic pores through which air can be caused to pass or diffused for combining with the contained column in such leg to reduce the specific gravity of such column and leaving the column in tha other leg of greater density and specific gravity. An extra air chamber is provided around the diffusion portion of the pipe through which the air is supplied, and conventional pressure control means being provided subject to pressure in the leg containing the denser liquid for controlling the supply of such air to operate the lift. If preferred a diaphragm air control valve may be employed of a sensitiveness that the liquid level in the inlet pipe need only rise about a couple of feet to actuate it.

With continued reference to the drawings, the invention is intended to be used for lifting sewage from a sewer pipe 10 at a lower elevation to a sewer pipe 11 at a slightly higher elevation, it being understood that the invention is of a capacity to accommodate the normal flow of sewage with a single lift system although it is preferred to employ two of such lift systems as a safety factor, each of which has a capacity to accommodate the full flow but combined can accommodate excess flow and permit one of the systems to be rendered inoperative for cleaning or repair without disturbing the operation of the other or the sewage system. The invention is designed to be located in a hole 12 which may or may not have a container 13 therein.

The sewer 10 is in communication with the interior of a cylinder 14 which may be of masonry or other substance and in which are located shorter chord forming relatively straight walls 15 and 16 connected by an overflow pipe 17. The cylinder 14 constitutes in effect a lining for a manhole which may be closed by a suitable manhole cover 18 having inspection openings 19 and 20 with lids 21 and 22 respectively. The pipe 10 discharges into a compartment 23 formed between an arcuate portion of the cylinder wall 14 and the straight wall 15 and means is provided for transferring the sewage from the lower level in compartment 23 to a high level in a similar compartment 24 formed between the cylinder 14 and the wall 16.

In order to accomplish such transfer, one or more pipes 25 extend through the wall 15 and such pipes are provided with flanges 26 which are connected by bolts 27 to flanges 28 on one end of reducers 29. The opposite ends of such reducers have flanges 30 secured by bolts 31 to the flanges 32 of a shutoff valve 33. The shutoff valve has a similar flange 34 at its opposite end connected by means of bolts 35 to the flange 36 of a plastic coupling member 37 which is welded or fused to a nipple 38 the opposite end of which is connected to one side of a union 39. The opposite side of such union is welded or fused to an elbow 40 which is connected at its lower end by a coupling 41 to a straight length of pipe 42 the lower end of which is connected by a second coupling 41 to a trap forming elbow 43. The other end of the trap forming U member fits into and is fused or welded to a bushing 44 located in a flanged coupling 45. The coupling 45 is connected by bolts and nuts 46 to a second flanged coupling 47 located around a pipe of greater diameter than the U member 43 and of the same diameter as the bushing 44. The couplings 45 and 47 secure the bushing 44 to the pipe 48 which forms the lower end of a dual wall air chamber.

The opposite end of the outer concentric pipe 48 which forms the outer wall of an air chamber is secured by means of flanged couplings 45 and 47 fastened by bolts and nuts 46 to an additional bushing 44 forming the opposite end of the air chamber, a Carborundum diffuser tube 49 having pores through which air but not liquid can pass is centrally located inside the pipe 48 and held in place by bushings 44, the ends of the tube 49 being provided with gaskets or O-rings 50 to seal the ends between the tube 49 and bushings 44 to keep sand or solids out of the annular air chamber located between the outer wall of diffuser tube 49 and inner wall of pipe 48. Air is admitted to this air chamber by means of an air line or tube 51 and is then allowed to pass through the diffuser tube 49 and into the sewage flow.

Fitted and fused or welded within the upper bushing 44 is a plastic pipe 52 which extends upwardly to greater height than the plastic pipe 42 which forms the other leg of the U, and the pipe 52 is connected by fusion or welding to another coupling 41 in which is fitted and fused or welded an elbow 53. The upper end of the elbow 53 is connected by a union 54 to a nipple 55 which in turn is connected to a plastic coupling flange 56 bolted to a flange 57 on the small end of a reducer 58. The opposite or large end of such reducer has a flange 59 which is connected by bolts 60 to a flange 61 on a cast iron pipe 62 in communication with the compartment 24 from which the sewage is permitted to escape through the upper sewer 11. The internal diameter of the several pipes and couplings are of uniform size to avoid providing an obstruction to flow therethrough.

Sewage flowing into the U tube will fill both legs to the same height and a sensing or controlling tube connection 65 is provided subject to increase in pressure in the upper end of the sewage inlet. This control tube extends to a diaphragm or other type of air control valve 66 to which the tube 51 is likewise connected and through which tube air is supplied to the chamber around the diffuser tube 49 so that the addition of air to the column within the leg of the U member 43 having the diffuser segment therein will be lighter or have a lower specific gravity and due to the denser or higher specific gravity in the other leg of the U member 43 the liquid in the lighter leg will be pushed up such leg past the diffuser 49 and into pipe 52 until it is discharged into the compartment 24 and the sewer 11. A threaded quickly opened drain valve 67 may be applied to the bottom of the return bend 43 for draining the system.

Air under pressure is supplied to the air control valve 66 by an air line 68 from a source of supply such as an air pump within a pump house 69. The air control valve 66 is connected to the air line 68 by a cross connection 70 having a water trap 71 suspended from the bottom connection thereof. Air enters the control valve through a line 72 subject to a manually operated cutoff valve 73 and passes through a filter 74 and a pressure reducer 75 into a diaphragm operated valve 66 from which it is distributed through the line 51.

It will be apparent that each of the pressure controlled sewage lifts embodies a U-shaped tube, one leg of which contains water and sewage and the other leg of which contains water, sewage and entrapped air. The leg into which air has been introduced will be lighter and consequently the liquid will stand at a higher level than the more dense liquid of the opposite leg, and operating on the principle of the longer the column of liquid in the inlet leg above the point where air is injected into the outlet leg, the higher the liquid can be lifted in the outlet leg. Also, given a designated lift the efficiency of the device in terms of cubic feet of air per gallon of liquid pumped is proportioned to the percent submergence, that is, the ratio of the depth of liquid in the inlet leg above the air injection device to the depth of liquid in the outlet leg. The deeper the device, the less the air requirements but the more expensive the cost of construction, a reasonable compromise for a low lift having been determined as a submergence of 75%.

An important advantage of the invention is the lack of the necessity for a holding sump. By utilization of small pipes the length of time the sewage remains in the station is almost negligible, and without the collection and retention of sewage in such sump for several hours with the undesirable results, which in sub-tropical areas with high sewage temperature the holding time is sufficient to cause the sewage to become septic, making it obnoxious and difficult to treat when it reaches the sewage treatment plant. The chamber between the outer enlarged tube and a smaller Carborundum tube accommodates air injected into the chamber so that it diffuses through the Carborundum tube uniformly to the body of water within such tube insuring the operation of the lift. Air may be supplied to the chamber from a suitable air line or other desired source subject to a pressure control in the leg of the U of greater specific gravity and the diaphragm air control valve is so sensitive that the liquid level in the inlet pipe need only rise about a couple of feet to cause it to operate. This means that in the present invention using 3" plastic pipe, an inflow of only 338 cubic inches of sewage which is less than two gallons will cause the air valve to open ejecting a gallon or two into the high level sewer, and having the added advantage that flow from the low sewer to the higher will occur at about the same rate as flow in the inlet sewer. In view of the fact that the only moving parts in the present invention are the control diaphragm and, if desired, a cut-off valve the system is completely enclosed in water-tight plastic and metal pipe, and all of it including the valves will function satisfactorily under water avoiding the necessity for a water-tight dry sump, but only walls or bottom in the pit in which the pump is installed to keep the earth from caving in or sand from filling in from the bottom. If the geology of the earth is such that caving or filling will not occur, the pump may be installed in an open pit and ground water may rise to within 2 or 3 feet of the surface of the ground without interfering with the operation of the unit.

Since the unit is light it may readily be removed for repair by a workman without special equipment. To do this the cutoff valve 33 is closed with a long handle wrench from near the surface of the ground; the drain valve 67 is opened in the bottom of the U-number 43 of the unit to allow the sewage within the unit to drain therefrom. The two plastic unions 39 and 54 are broken, these may be fastened together merely finger tight, and the entire unit is lifted through the manhole opening 20 to the surface. The porous air diffuser which is the only part requiring periodic servicing, can then be removed by unscrewing the bolts 46 holding the plastic flanges 45 and 47 together.

The present invention requires less than two gallons inflow to cause its operation and thereafter the outflow is exactly equal to the inflow up to the total capacity of the pump. This means that sewage flows to the disposal plant site exactly as it would flow if the entire system were on a single slope without any type of pumping device.

In the present invention there are no sharp corners to catch solids or restrict flow, the Carborundum air diffuser tube has the same inside diameter as the plastic piping and this permits an even flow without clogging by catching of solids on protruding edges or corners. The plastic bends are on a long 12" radius to change the direction of flow from horizontal inflow to vertical downward flow, from vertical downward to vertical upward, and from vertical upward to horizontal discharge. The 180-degree U member on the bottom of the unit also serves as a necessary tail pipe or trap to prevent backflow of the diffused air and the absence of check valves assures uninterrupted operation.

Sediment in the form of sand or solids in the bottom of the unit may be easily removed by closing the cutoff valve and injecting air through the pilot bubbler line which passes a fine stream of air at all times into the inlet side of the unit. This will force air to build up in the inlet side of the unit under full air line pressure and if the stoppage has less resistance to movement than the air pressure, it will be forced into the outlet pipe and out of the unit.

The installation contemplated by the present invention is susceptible of individual or multiple installation. The installation illustrated employs two parallel pumping units which assure continuous operation if one of said units should become inoperative and such units may be subject to a single or individual control valve and where a single control valve is utilized, both units will function simultaneously until one becomes clogged or becomes inoperative for some other reason. Having the capacity of each of the multiple installations sufficient to accommodate as much sewage as normally will flow in a 8" sewer provides a safety factor for excessive or peak loads as well as to handle normal loads while one unit is out of action as indicated. The multiple units also can be operated with the pilot line inlets at different depths below the inflow sewer, one unit being made to operate on low flow while the other may be caused to operate when the flow exceeds the capacity of the first unit, any desired arrangement being contemplated. However it has been found that simultaneous operation with a single air control unit ordinarily is preferable because of low installation costs and the fact that the Carborundum diffuser will operate longer between cleanings if frequently used than if allowed to stand full of sewage for long periods.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An air lift pump for a sewage system having a sewage inlet pipe and a sewage outlet pipe, said pump comprising multiple U-shaped pipe systems each having a substantially vertical first leg in communication with said inlet pipe and a longer substantially vertical second leg in communication with said outlet pipe, said first and second legs being connected by a U-shaped trap-forming bight portion, a porous liquid impervious air diffusing tube located between said second leg and said U-shaped bight portion, the pores of said diffusing tube being of a size to permit air to pass therethrough but to prevent the passage of liquid, an air-tight casing about said diffusing tube forming an air-tight chamber, a source of air under pressure, a connection to said source of air under pressure extending into said chamber, a pressure control regulating the supply of air under pressure to said chamber, and said pressure control being responsive to a pressure in said first leg whereby the air under pressure within said chamber passes through the pores of the diffusing tube and mixes with the water in the second leg to raise the column of water to an elevation above the first leg.

2. Apparatus for lifting sewage suspended in a liquid from a lower to a higher elevation comprising a generally U-shaped air lift pump, said pump being of relatively light-weight plastic pipe including individual straight and curved segments of uniform internal diameter and with the legs of the U-shaped pump being disposed in substantially vertical position, the first leg being in communication with a supply of liquid and sewage and the second leg extending upwardly above the first leg and discharging such liquid and sewage into an outlet pipe at a higher elevation, said first and second legs being connected at their lower extremities by a trap-forming bight portion, a porous liquid impervious Carborundum diffusing tube disposed between said bight portion and said second leg, an air-tight casing surrounding said diffusing tube, spaced bushings sealing the space between said diffusing tube and said casing to provide an annular chamber around said diffusing tube, means for introducing air under pressure into said chamber, the pores of said diffusing tube being of a size to permit air to pass therethrough but preventing the passage of liquid and sewage whereby air under pressure is added to the column of liquid in the second leg to raise such column of liquid to a higher level than the liquid in the first leg.

References Cited in the file of this patent

UNITED STATES PATENTS

| | | |
|---|---|---|
| 779,941 | Hughes | Jan. 10, 1905 |
| 834,818 | Leland | Oct. 30, 1906 |
| 914,475 | Beduwe | Mar. 9, 1909 |
| 987,729 | Long | Mar. 28, 1911 |
| 1,006,822 | Beddoes | Oct. 24, 1911 |
| 1,314,539 | Rust | Sept. 2, 1919 |
| 1,319,797 | Rogers | Oct. 28, 1919 |
| 1,427,317 | Oliphant | Aug. 29, 1922 |
| 1,591,318 | Johansen | July 6, 1926 |
| 1,757,267 | Stanley | May 6, 1930 |
| 2,434,027 | Whittington | Jan. 6, 1948 |
| 2,506,790 | Ihrig | May 9, 1950 |
| 2,525,897 | Greene | Oct. 17, 1950 |
| 2,633,086 | Zaba | Mar. 31, 1953 |
| 2,656,794 | Williamson | Oct. 27, 1953 |
| 2,781,000 | Thomas | Feb. 12, 1957 |

FOREIGN PATENTS

| | | |
|---|---|---|
| 402,723 | France | Oct. 15, 1909 |